United States Patent
Deslandes et al.

(10) Patent No.: US 10,996,651 B2
(45) Date of Patent: May 4, 2021

(54) ORIENTATION OF A REAL OBJECT FOR 3D PRINTING

(71) Applicant: DASSAULT SYSTEMES, Velizy Villacoublay (FR)

(72) Inventors: Arnaud Deslandes, Suresnes (FR); Jean-Francois Rameau, Lisses (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 395 days.

(21) Appl. No.: 15/823,169

(22) Filed: Nov. 27, 2017

(65) Prior Publication Data
US 2018/0150059 A1 May 31, 2018

(30) Foreign Application Priority Data
Nov. 25, 2016 (EP) .................................... 16306560

(51) Int. Cl.
| | |
|---|---|
| *G05B 19/4099* | (2006.01) |
| *B29C 64/386* | (2017.01) |
| *B29C 64/40* | (2017.01) |
| *B33Y 50/00* | (2015.01) |
| *G06F 30/00* | (2020.01) |
| *G06F 30/23* | (2020.01) |
| *B33Y 50/02* | (2015.01) |
| *B29C 64/393* | (2017.01) |
| *G06F 119/18* | (2020.01) |

(52) U.S. Cl.
CPC ........ *G05B 19/4099* (2013.01); *B29C 64/386* (2017.08); *B29C 64/393* (2017.08); *B29C 64/40* (2017.08); *B33Y 50/00* (2014.12); *B33Y 50/02* (2014.12); *G06F 30/00* (2020.01); *G06F 30/23* (2020.01); *G05B 2219/49023* (2013.01); *G06F 2119/18* (2020.01); *Y02P 90/02* (2015.11)

(58) Field of Classification Search
CPC .... G05B 19/4099; G33Y 50/00; B33Y 50/02; B29C 64/386
USPC .......................................................... 703/1
See application file for complete search history.

(56) References Cited

FOREIGN PATENT DOCUMENTS

| | | |
|---|---|---|
| EP | 2 926 982 A1 | 7/2015 |
| WO | WO 2016/088118 A1 | 6/2016 |

OTHER PUBLICATIONS

Allen_1994 (On the Computation of Part Orientation Using Support Structures in Layered Manufacturing, University of Michigan, 1994) (Year: 1994).*
Ezair_2015 (Orientation analysis of 3D objects toward minimal support volume in 3D-printing, Computer & Graphics 2015). (Year: 2015).*
Inui_2015 (Thickness and clearance visualization based on distance field of 3D objects, Journal of Computational Design and Engineering 2 (2015) 183-194) (Year: 2015).*

(Continued)

*Primary Examiner* — Brian S Cook
(74) *Attorney, Agent, or Firm* — Oblon, McClelland, Maier & Neustadt, L.L.P.

(57) ABSTRACT

Described herein is a computer-implemented method for orienting 3D printing of a real object. The method comprises obtaining a 3D modeled object that represents the real object. The method also comprises determining one or more orientations of the 3D modeled object for which an overhang volume is optimal. This improves 3D printing.

20 Claims, 8 Drawing Sheets

(56) References Cited

OTHER PUBLICATIONS

Sparling_2001 (Volumes, Dated Apr. 8, 2001, downloaded from www.math.pitt.edu/~sparling/23012/23012volints1/23012volints1/node1.html ) (Year: 2001).*
European Office Action dated Jun. 6, 2019 in European Patent Application No. 16306560.0, 8 pages.
Ezair, B.. et al., "Orientation analysis of 3D objects toward minimal support volume in 3D-printing", Computers & Graphics, vol. 51, XP55591847A. Jun. 2, 2015, pp. 117-124.
Office Action dated May 29, 2017, in European Patent Application No. 16306560.0-1954.
Marijn P. Zwier, et al.; "Design for Additive Manufacturing: Automated Build Orientation Selection and Optimization"; Procedia CIRP Global Web Conference Research and Innovation for Future Production; vol. 55, Nov. 2, 2016; pp. 128-133; XP055373404; ISSN: 2212-8271.
J. Vanek et al.; "Clever Support: Efficient Support Structure Generation for Digital Fabrication"; Eurographics Symposium on Geometry Processing 2014; Computer Graphics Forum; vol. 33, No. 5; Aug. 23, 2014; pp. 117-125; XP055372424; GB ISSN: 0167-7055.
Seth Allen, et al.; On the Computation of Part Orientation Using Support Structures in Layered Manufacturing; Solid Freeform Fabrication Symposium 1994, University of Texas, Austin, 1994; pp. 259-269; XP055459700.

* cited by examiner

ORIENTATION OF A REAL OBJECT FOR 3D PRINTING

CROSS-REFERENCE TO RELATED APPLICATIONS

This application claims priority under 35 U.S.C. § 119 or 365 to European Application No. 16306560.0, filed Nov. 25, 2016. The entire contents of the above application is incorporated herein by reference.

FIELD OF THE INVENTION

The invention relates to the field of computer programs and systems, and more specifically to a method, system and program for orienting 3D printing of a real object.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behavior of a future product. CAM is an acronym for Computer-Aided Manufacturing, e.g. it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Three-dimensional (3D) printing can make use of these systems and programs. 3D printing, also known as additive manufacturing, refers to various processes used to synthesize a real object. In 3D printing, successive layers of material are formed under computer control to create said real object. The resulting object can be of any shape and is the physical instance of a virtual solid, for example previously designed by using a CAD system.

Within this context, there is still a need to improve 3D printing.

SUMMARY OF THE INVENTION

It is therefore provided a computer-implemented method for orienting 3D printing of a real object. The method comprises providing a 3D modeled object that represents the real object. The method also comprises determining one or more orientations of the 3D modeled object for which an overhang volume is optimal.

It is further provided a process for 3D printing a real object. The process comprises orienting 3D printing of the real object according to the above method. The process thereby comprises determining one or more orientations of the 3D modeled object for which an overhang volume is optimal. The process then comprises 3D printing the real object in one of the determined one or more orientations.

In examples, the 3D printing of the real object may comprise determining supports for overhang surfaces of the real object with respect to said one of the determined one or more orientations, 3D printing the real object together with the supports in said one of the determined one or more orientations, and then removing the supports.

In examples, the 3D printing may be performed according to any additive manufacturing technique, for example comprising extrusion 3D printing such as including fused deposition modeling (FDM), fused filament fabrication (FFF), and/or robocasting or direct ink writing (DIW), light polymerized 3D printing such as including stereolithography (SLA) and/or digital light processing (DLP), It is further provided a computer program comprising instructions for performing the method and/or the process.

It is further provided a computer readable storage medium having recorded thereon the computer program.

It is further provided a system comprising a processor coupled to a memory, the memory having recorded thereon the computer program. The system may further comprise a graphical user interface.

In examples, the system may be a 3D printing system. In examples, the system may be configured or programmed to perform the above process for 3D printing.

In examples, the orienting of the 3D printing may comprise any one or any combination of the following:
- the determining of the one or more orientations includes computing, for each one of a finite discrete set of orientations, a respective overhang volume, and identifying one or more orientations of the 3D modeled object for which the computed overhang volume is optimal;
- the discrete set of orientations corresponds to a constant-density sampling of a domain of all orientations;
- the determining of the one or more orientations further includes, for one or more of the identified orientations for which the computed overhang volume is optimal, determining one or more other orientations of the 3D modeled object that correspond to a snapping of the 3D modeled object, computing, for each one of the one or more other orientations, a respective overhang volume, and identifying one or more other orientations of the 3D modeled object for which the computed overhang volume is optimal;
- computing a respective overhang volume for each orientation of the discrete set comprises positioning the 3D modeled object in the orientation or in an opposite orientation, determining overhang segments, and summing length of the overhang segments;
- the discrete set of orientations comprises at least one pair including an orientation and its opposite, the positioning of the 3D modeled object being performed only once for the pair;
- at least one same overhang segment is determined for both orientations of the pair, said same overhang segment being determined only once for the pair;
- the determining of overhang segments comprises determining intersections between vertical lines and the 3D modeled object and determining segments of the vertical lines that correspond to overhang;

the 3D modeled object comprises a polygonal mesh;
the vertical lines cover the 3D modeled object; and/or
the determining of the intersections between vertical lines and the 3D modeled object includes projecting the 3D modeled object on a horizontal plane, determining a bounding box of the projection of the 3D modeled object on the horizontal plane, defining a grid of points in the bounding box, and defining the vertical lines based on the grid of points.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

The computer-implemented method for orienting 3D printing of a real object comprises providing a 3D modeled object that represents the real object, and determining one or more orientations of the 3D modeled object for which an overhang volume is optimal. Thus, the method improves 3D printing.

Orienting the 3D printing of a real object designates any action or series of actions that outputs data representative of one or more orientations in which to 3D print the real object with respect to one or more predetermined criteria. The one or more orientations may be defined relative to the vertical and downward direction in the terrestrial reference frame (in other words, the gravity direction).

In particular, the method determines one or more orientations of the 3D modeled object for which an overhang volume is optimal. During the 3D printing of a solid, the solid orientation may induce so-called "overhang surfaces". Overhang surfaces are outer surfaces of the real object which, due to the effect of gravity, require additional material for support purpose. The expression "overhang volume" designates any data value representative of a volume below said overhang surfaces, for example the volume between said overhang surfaces and a contact plane of the 3D printing.

An overhang volume is said to be optimal when its value corresponds at least substantially to (which includes approximations of) the result of an optimization program which penalizes said overhang volume (i.e. tends to minimize said overhang volume). The method thus outputs one or more orientations for which said overhand volume tends to be the smallest value(s) possible. For example, the overhang volume stems from such an optimization program. The optimization program may penalize overhang volume only, or alternatively one or more other parameters in addition to overhang volume. The optimization program may consist in or correspond to finding the one or more orientations for which overhang volume is minimal, for example under one or more constraints, or alternatively under no constraint. In an example the optimization program may simply consist in minimizing an overhang volume under the constraint that distance between the real object and a contact plane (i.e. so-called "offset distance" of 3D printing processes) be superior or equal to a predetermined—e.g. fixed—distance (noted d in later examples), the predetermined distance being possibly superior or equal to zero.

Figure 1:
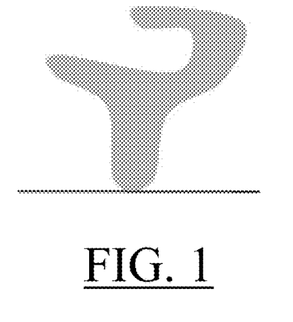
FIGS. 1, 2, and 3 illustrate the improvement of 3D printing by the method.
Figure 2:
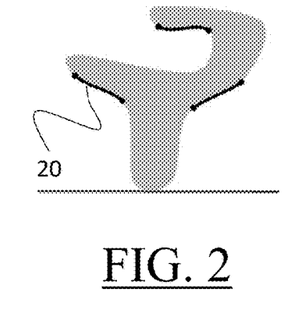
Figure 3:
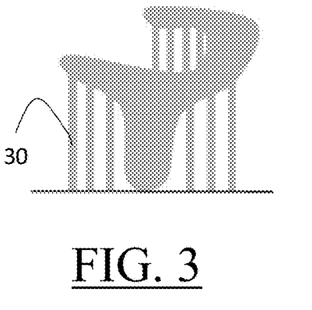

During a 3D printing process, the current amount of molten material (for example getting out of a nozzle) may require a short period of time to get solid. Referring to FIGS. 1-3, if a real object (shown on FIG. 1) features some overhang surfaces (represented by bold curves 20 on FIG. 2), the material can slightly bend downward during the solidification time, producing an unwanted shape. As widely known, in order to avoid this phenomenon, supports may be added to the target shape where the overhang volume is too large (supports 30 shown on FIG. 3). From the manufacturing process point of view, said supports may be integrated to the target shape and may be made with the same material. The supports may be removed a posteriori, that is, after the real object is totally printed together with the supports. Given an orientation for 3D printing the real object, techniques are known from the prior art to design the shape of actual supports. An example technique is provided in paper "J. Vanek, J. A. G. Galicia and B. Benes, *Clever Support: Efficient Support Structure Generation for Digital Fabrication*, Eurographics Symposium on Geometry Processing 2014, Volume 33 (2014), Number 5". The method may in examples implement any such techniques.

The method determines one or more orientations of a 3D modeled object representing the real object for which an overhang volume is optimal. In other words, the method determines one or more optimal orientations for 3D printing the real object with respect to the criterion of having an overhang volume as small as possible. This makes the design of the actual supports easier. Indeed, as the overhang volume is optimal, a relatively smaller space needs to be considered to design the supports. This reduces the complexity of such design. Furthermore, the amount of material consumed by the supports is correlated to the size of the overhang volume. The method thus helps reducing material consumption and waste. Moreover, as the method optimizes overhang volume, the method also optimizes correlated overhang surface. The method thus reduces the zone where material bending can result in unwanted shapes, thereby increasing quality of the result of a later 3D printing process.

The method orients 3D printing based on a 3D modeled object that represents the real object. Thus, the method allows an optimal 3D printing with respect to overhang volume, starting from the first printed instance of the real object.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

The method generally manipulates modeled objects. A modeled object is any object defined by data stored e.g. in the database. By extension, the expression "modeled object" designates the data itself. According to the type of the system, the modeled objects may be defined by different kinds of data. The system may indeed be any combination of a CAD system, a CAE system, a CAM system, a PDM system and/or a PLM system. In those different systems, modeled objects are defined by corresponding data. One may accordingly speak of CAD object, PLM object, PDM object, CAE object, CAM object, CAD data, PLM data, PDM data, CAM data, CAE data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g. non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g. representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e. increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

By CAM solution, it is additionally meant any solution, software of hardware, adapted for managing the manufacturing data of a product. The manufacturing data generally includes data related to the product to manufacture, the manufacturing process and the required resources. A CAM solution is used to plan and optimize the whole manufacturing process of a product. For instance, it can provide the CAM users with information on the feasibility, the duration of a manufacturing process or the number of resources, such as specific robots, that may be used at a specific step of the manufacturing process; and thus allowing decision on management or required investment. CAM is a subsequent process after a CAD process and potential CAE process. Such CAM solutions are provided by Dassault Systèmes under the trademark DELMIA®.

By CAE solution, it is additionally meant any solution, software of hardware, adapted for the analysis of the physical behavior of a modeled object. A well-known and widely used CAE technique is the Finite Element Method (FEM) which typically involves a division of a modeled objet into elements which physical behaviors can be computed and simulated through equations. Such CAE solutions are provided by Dassault Systèmes under the trademark SIMULIA®. Another growing CAE technique involves the modeling and analysis of complex systems composed of a plurality components from different fields of physics without CAD geometry data. CAE solutions allow the simulation and thus the optimization, the improvement and the validation of products to manufacture. Such CAE solutions are provided by Dassault Systèmes under the trademark DYMOLA®.

PDM stands for Product Data Management. By PDM solution, it is meant any solution, software of hardware, adapted for managing all types of data related to a particular product. A PDM solution may be used by all actors involved in the lifecycle of a product: primarily engineers but also including project managers, finance people, sales people and buyers. A PDM solution is generally based on a product-oriented database. It allows the actors to share consistent data on their products and therefore prevents actors from using divergent data. Such PDM solutions are provided by Dassault Systèmes under the trademark ENOVIA®.

Figure 4:
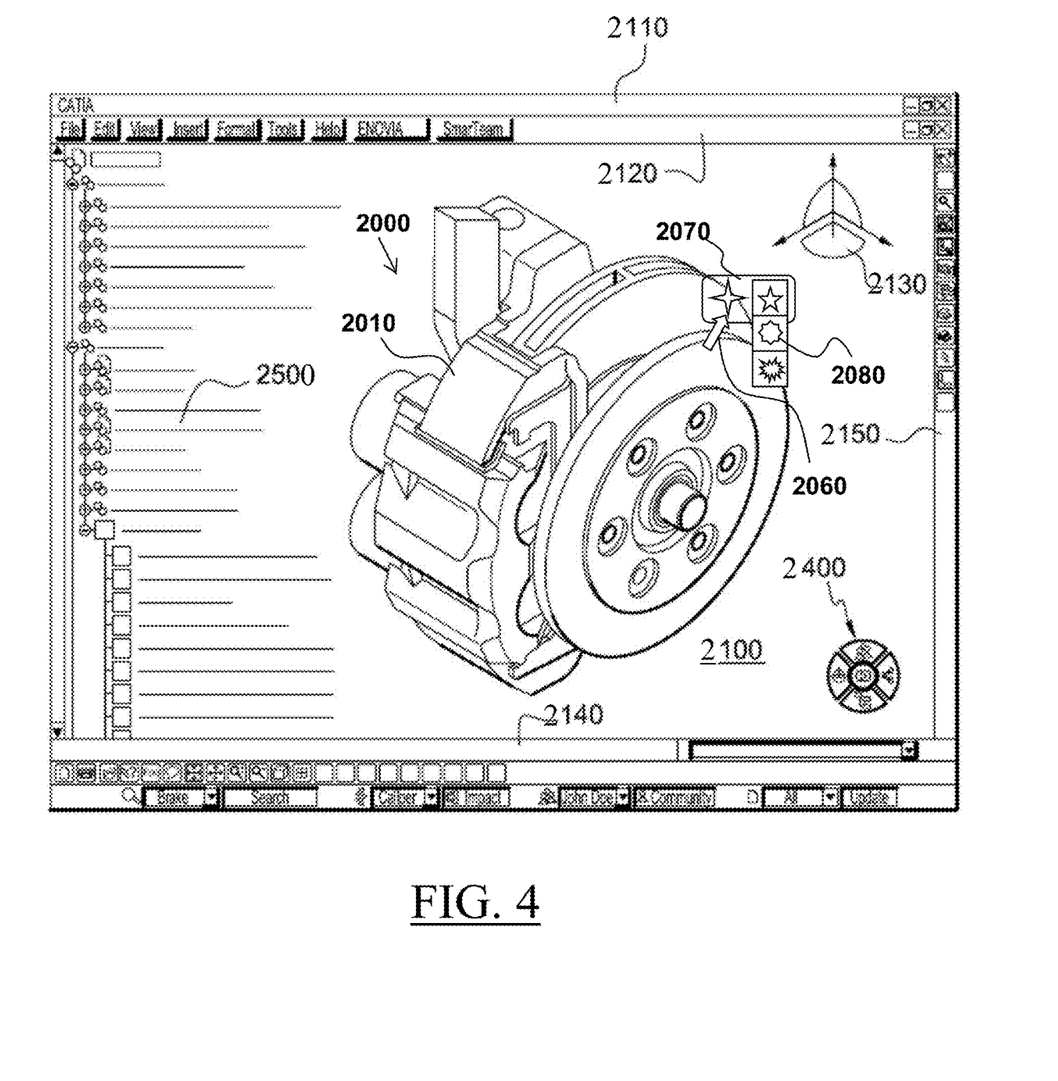
FIG. 4 shows an example of a graphical user interface of the system.

FIG. 4 shows an example of the GUI of the system, wherein the system is a CAD system. The GUI can be used to design a 3D modeled object for later 3D printing. At any time, the user can launch the method and determine orientation for the 3D printing. The determined one or more orientations can be added to the data defining the 3D modeled object (e.g. to the data file).

The GUI 2100 may be a typical CAD-like interface, having standard menu bars 2110, 2120, as well as bottom and side toolbars 2140, 2150. Such menu- and toolbars contain a set of user-selectable icons, each icon being associated with one or more operations or functions, as known in the art. Some of these icons are associated with software tools, adapted for editing and/or working on the 3D modeled object 2000 displayed in the GUI 2100. The software tools may be grouped into workbenches. Each workbench comprises a subset of software tools. In particular, one of the workbenches is an edition workbench, suitable for editing geometrical features of the modeled product 2000. In operation, a designer may for example pre-select a part of the object 2000 and then initiate an operation (e.g. change the dimension, color, etc.) or edit geometrical constraints by selecting an appropriate icon. For example, typical CAD operations are the modeling of the punching or the folding of the 3D modeled object displayed on the screen. The GUI may for example display data 2500 related to the displayed product 2000. In the example of the figure, the data 2500, displayed as a "feature tree", and their 3D representation 2000 pertain to a brake assembly including brake caliper and disc. The GUI may further show various types of graphic tools 2130, 2070, 2080 for example for facilitating 3D orientation of the object, for triggering a simulation of an operation of an edited product or render various attributes of the displayed product 2000. A cursor 2060 may be controlled by a haptic device to allow the user to interact with the graphic tools.

Figure 5:
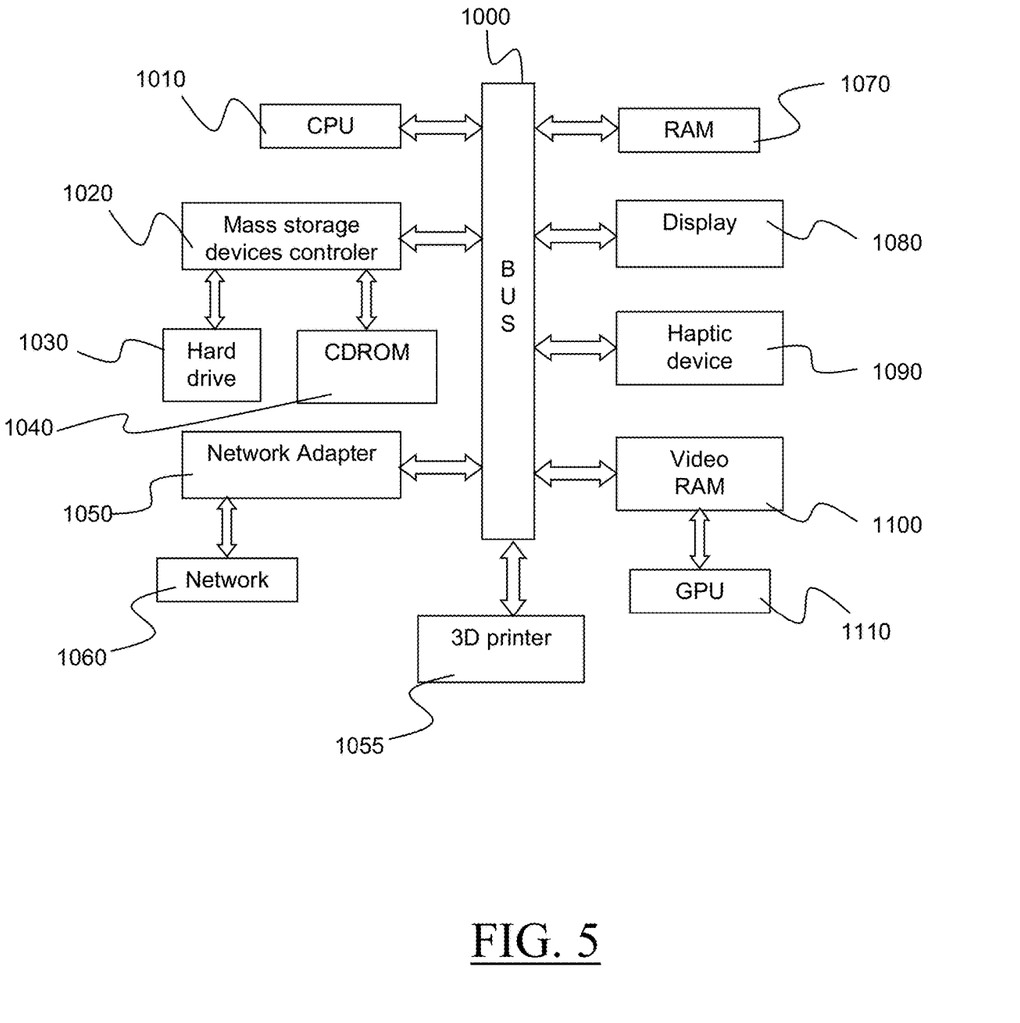
FIG. 5 shows an example of the system.

FIG. 5 shows an example of the system, wherein the system is a client computer system, e.g. a workstation of a user.

The client computer of the example comprises a central processing unit (CPU) 1010 connected to an internal communication BUS 1000, a random-access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen. The system may also comprise a 3D printer 1055.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Figure 6:
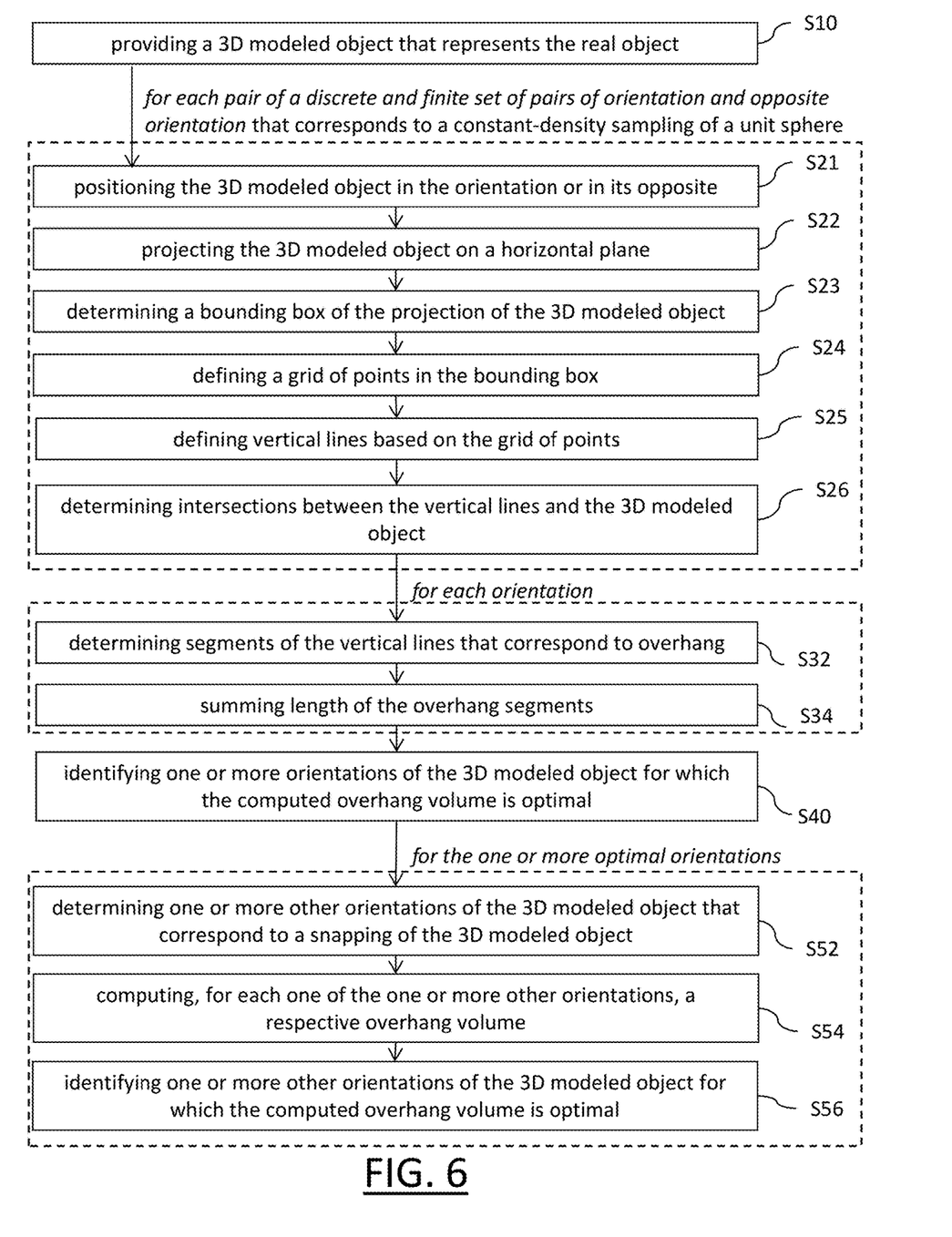
FIG. 6 shows a flowchart of an example of the method.

FIG. 6 shows an example of the method which is particularly efficient in terms of computing speed and resource consumption. The example implements different independent options which each contribute to robustly obtain an accurate result in a fast and efficient manner.

The method starts with the providing S10 of a 3D modeled object that represents the real object. For example, a user who has designed the 3D modeled object (or who receives such 3D modeled object from a distance computer/user) launches a 3D printing orientation functionality.

The 3D modeled object may consist of a discrete and finite aggregation of geometries that each represent local shape of the real object. This allows a fast performance of the method, compared to parametric or implicit geometries which involve complex computations. The 3D modeled object may notably consist of a mesh representation of the shape of the real object. The mesh may be a polygonal mesh, such as a quad mesh or a triangular mesh. Such types of 3D modeled object allow easy and fast geometrical computations performed later by the method.

The method then explores candidate orientations in order to output one or more such candidates that is(are) optimal with respect to overhang volume. For that, the method first performs a scheme S21-S26 looping on a discrete and finite set. Reducing an initially complex problem (from the algorithmic point of view) to a discrete optimization on a finite domain allows robustness of the method.

The discrete set is specifically designed for a fast performance of the method (i.e. one and only one iteration of the scheme for each element of the set). The discrete set is a finite set of pairs each consisting of an orientation (candidate for final output by the method) and its opposite orientation (i.e. same line but opposite direction, which is also a candidate). In other examples, the method may loop on each candidate orientation instead of considering pairs, but the consideration of pairs allows synergizing computations (e.g. reusing for a second element of a pair a computation previously performed for a first element of the pair). S26 discussed later is notably particularly time-consuming, such that when a same intersection is involved by two opposite orientations (which is often the case), computing it only once is particularly efficiency-increasing. In yet other examples, the set of candidate orientations is not symmetric (i.e. not all candidate orientations have their opposite orientation in the set). Adaptation of the method of FIG. 6 to such examples is straightforward.

The discrete set may in examples correspond to a sampling of a unit sphere. In other words, the candidate orientations each correspond to a respective point of a unit sphere (e.g. the orientation being defined by said point and the center of the unit sphere e.g. using a predetermined ordering convention), the points of the unit sphere stemming from a sampling of the sphere. The sampling may cover the sphere, which means that the sampling is not local but global, so that all orientation regions are explored.

The sampling may notably be a constant-density sampling. This means that the sampling is not random or a circle-by-circle regular sampling, but a constant-density sampling (i.e. the number of sample points for each constant-surface patch on the sphere is substantially the same wherever the patch is positioned on the sphere). This allows a better exploration of the domain of orientations (which has been reduced when discretized). In other words, such sampling involves a lesser loss of information.

Scheme S21-S26 is now discussed.

For a given pair of candidate and opposite orientations, scheme S21-S26 prepares computing a overhang volume for each of the two orientations so as to eventually compare all computed volumes toward determining one or more of optimal orientations. The computations involved in scheme S21-S26 are relatively efficient.

The scheme is performed relative to a predetermined constant frame. The scheme starts with positioning S21 the 3D modeled object in the frame according to any one of the two orientations of the pair. The scheme then comprises projecting S22 the 3D modeled object on a horizontal plane. The horizontal plane or the 3D modeled object may be positioned in the frame to respect earlier-mentioned offset distance. Another horizontal frame may be positioned (at this time of the scheme or at a later time) on the other side of the modeled object so as to respect earlier-mentioned offset distance for the other one of the two orientations of the pair (this is used later—at S32 precisely). The scheme then comprises determining S23 a bounding box of the projection of the 3D modeled object on the horizontal plane. The bounding box may be a rectangle of minimal size that encompasses the projection. The determining S23 may be performed according to any known technique. The scheme then comprises defining S24 a grid of points in the bounding box. The grid may be regular (e.g. forming an array of points with a predetermined and constant step, e.g. common to both directions) and/or have a predetermined and fixed density of points. The scheme then comprises defining S25 vertical lines based on the grid of points. Each vertical line includes a respective point of the grid and the beam of vertical lines crosses and covers the 3D modeled object. The scheme then ends with determining S26 intersections between the vertical lines and the 3D modeled object. This computation is a geometrical one and is thus the most time-consuming. Thus, the use of a polygonal mesh and synergizing computation take here a particularly significant meaning.

At this point, the method then performs a scheme looping on each candidate orientation.

The scheme first comprises determining overhang segments. This is performed using the intersection determined at S26 and by determining S32 segments of the vertical lines that correspond to overhang, said segments being delimited by said intersections (and a respective one of the two horizontal planes at the extremity, depending on whether the 3D modeled object was positioned at S21 according to the candidate orientation or its opposite).

The scheme may then simply sum at S34 length of the overhang segment. Such sum provides a value representative of overhang volume (e.g. notably when the density of points of the grid is the same with respect to all iterations of S34, in other words when the density of points of the grid is the same at each iteration of S24). This makes the method particularly fast. The method may then simply identify S40 one or more orientations of the 3D modeled object for which the computed overhang volume is optimal (e.g. corresponding to the smallest value(s) of the sums computed at iterations of S34).

The result of S40 could be outputted. But instead of outputting the result of S40, the method of FIG. 6 further includes an option S52-S56, referred to as "snapping".

The method includes determining S52 one or more other orientations of the 3D modeled object that correspond to a snapping of the 3D modeled object. Each snapping consists in positioning the 3D modeled object in an orientation outputted by S40 and pivoting the 3D modeled object around its lowest vertex (when there is such a unique vertex, which is the general case) such that an adjacent face (of the polygonal mesh) becomes horizontal. The newly obtained orientation becomes a new candidate to be outputted by the method as providing optimal overhang volume. It has indeed been verified that this option can improve the result of S40. Namely, the option comprises computing S54, for each one of the one or more other orientations, a respective overhang volume, and then identifying S56 one or more other orientations of the 3D modeled object for which the computed overhang volume is optimal. Option S52-S56 may be performed for each orientation outputted by S40 and for each face adjacent to a lowest vertex.

The method may thus in examples position the 3D modeled object in a frame. The method may then, for each point of a grid of points included in a plane, determine the intersection between the z line and the 3D modeled object skin. The method may then sum length of segments contributing to overhang for the orientation and for the opposite. The grid of points may be determined for each iteration by a scheme that includes projecting all mesh vertices on the xy plane, determining a bounding box of projection, using a (e.g. 32×32) grid over said bounding box, the points being the centers of the grid cells. Computing the intersection between the z line and the 3D modeled object skin may be performed a single time for both an orientation and its opposite. The z-axis may correspond to the support direction of the orientation and of its opposite orientation (i.e. the gravity direction for one of the two).

Example implementations of the method are now discussed with reference to FIGS. 7-28.

For all possible orientations, the method of the example implementations may compute the corresponding support volume of the solid. Then, the orientation yielding the smallest support volume may be selected. Supports volume may be computed by using a line/solid intersection technique.

The method of the example implementations features the following advantages. Minimizing the support volume reduces the amount of material used for the target shape, and thus shortens the manufacturing time. It also reduces the post processing time dedicated to supports removal. In short, minimizing the support volume reduces the overall manufacturing cost.

Input Solid

The input solid may be designed by using the solid modeling interactive capabilities of a CAD system. It is noted S and its boundary surface is noted ∂S, which may be a triangulated surface. The outer normal vector at point Q∈∂s is noted N(Q). There is no restriction on the shape of solid S, provided it can be designed using solid modeling features of a CAD system.

Overhang Point

The overhang threshold is an angle noted $$\alpha \in ]0, \frac{\pi}{2}[.$$

It depends on the material used to print the physical object, a typical value is $$\alpha = \frac{\pi}{4}.$$

Given a normalized vector V∈ℝ³, named "direction" in the following, a point Q∈∂S is an overhang point if ⟨N(Q),V⟩ ≥cos α. Such threshold may be provided by the user, or predefined in the system.

Figure 7:
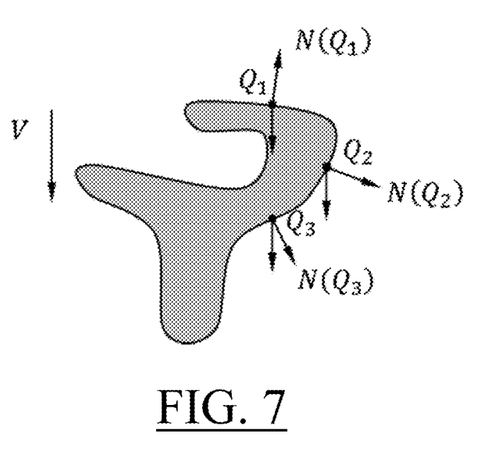
FIGS. 7, 8, 9, 10, 11, 12, 13, 14, 15, 16, 17, 18, 19, 20, 21, 22, 23, 24, 25, 26, 27 and 28 illustrate examples of the method.

FIG. 7 illustrates the situation with $$\alpha = \frac{\pi}{4}.$$

Point $Q_1$ is not an overhang point because ⟨N($Q_1$),V⟩ <0. Point $Q_2$ is not an overhang point because 0<⟨N($Q_2$),V⟩ <cos α. Point $Q_3$ is an overhang point because ⟨N($Q_3$),V⟩ >cos α.

Overhang Line Segment

Given the direction V and an offset distance d≥0, the contact plane P is defined by point A and vector V with P={X∈ℝ³,⟨X-A,V⟩=0}. Point A, which is not unique, is such that solid S is at distance d from P and included in the non-positive half space defined by P. Precisely, ⟨Q-A,V⟩ +d≤0 for all Q∈S, and there exists B∈S such that ⟨B-A,V⟩ +d=0. If d=0, solid S is tangent to plane P.

Figure 8:
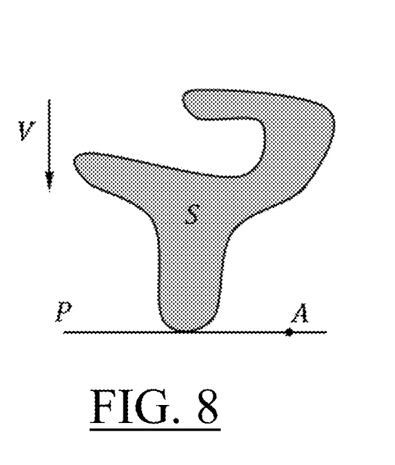
Figure 9:
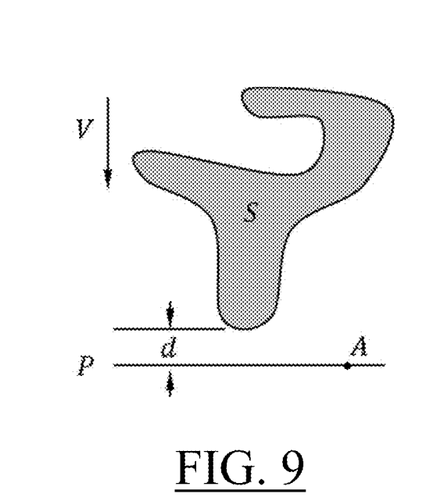

FIGS. 8-9 illustrates the contact plane P defined by solid S, direction V, distance d=0 (FIG. 8) and distance d>0 (FIG. 9). In the following, many figures are illustrated with d=0.

Given a point Z∈P, let Δ(Z) be the half line perpendicular to plane P included in the non-positive half space, that is Δ(Z)={Z-λV, λ≥0}. Consider $X_i$(Z), i=1, . . . , n(Z) the n(Z) intersection points of half line Δ(Z) with the boundary surface ∂S of solid S. Intersection points are parameterized by real numbers $\lambda_i$(Z) so that $X_i$(Z)=Z-$\lambda_i$(Z)V and they are sorted in such a way that $\lambda_1$(Z)< . . . <$\lambda_i$(Z)< . . . <$\lambda_{n(Z)}$(Z).

Figure 10:
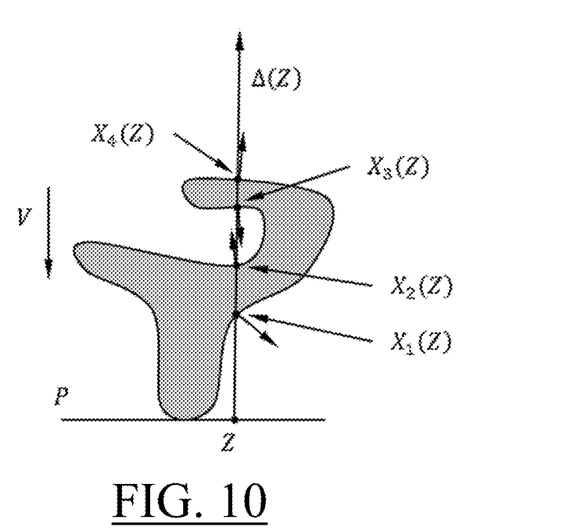

FIG. 10 illustrates the situation with n(Z)=4 intersection points.

By definition, a line segment [$X_i$(Z),$X_{i+1}$(Z)] is an overhang line segment if $Z_{i+1}$(Z) is an overhang point. The contribution of line Δ(Z) to the overhang volume is the union of all its overhang line segments. In the next formula, the convention is $X_0$(Z)=Z.

$$\bigcup_{\substack{i \in \{0,...,n(Z)-1\} \\ \langle V, N(X_{i+1}(Z)) \rangle \geq \cos\alpha}} [X_i(Z), X_{i+1}(Z)]$$

Figure 11:
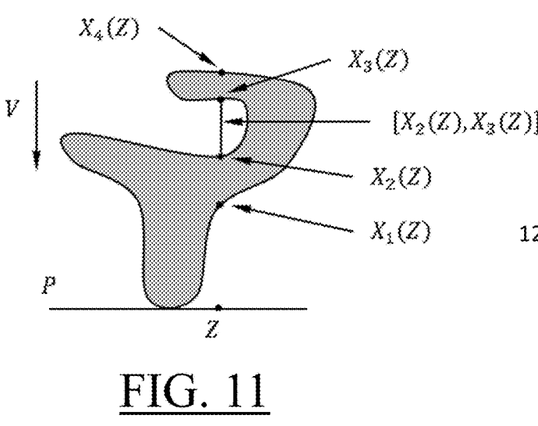

FIG. 11 illustrates the unique [$X_2$(Z),$X_3$(Z)] overhang line segment of line Δ(Z).

Overhang Volume, Support Volume

Formally, the overhang volume of solid S in direction V according to angle α, noted H(S,V,α), is the union of all overhang line segments for all points Z∈P such that Δ(Z) ∩∂S≠∅.

$$H(S, V, \alpha) = \bigcup_{\substack{Z \in P \\ \Delta(Z) \cap \partial S \neq \emptyset}} \left( \bigcup_{\substack{i \in \{0,...,n(Z)-1\} \\ \langle V, N(X_{i+1}(Z)) \rangle \geq \cos\alpha}} [X_i(Z), X_{i+1}(Z)] \right)$$

Figure 12:
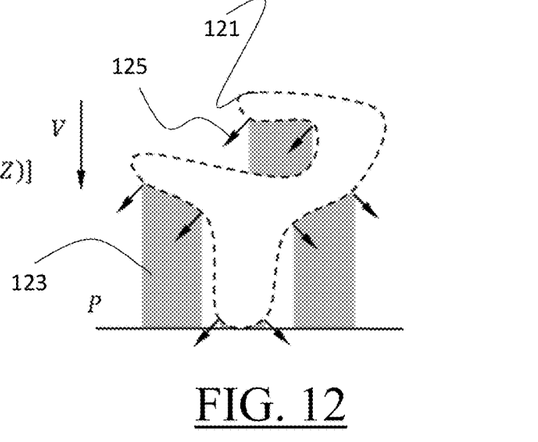

FIG. 12 illustrates the boundary surface of the solid (dotted line 121) together with the overhang volume (grey zone 123). Outer normal vectors 125 illustrate the overhang points limiting the overhang zones.

By definition, the supports volume s(S,V,α) is the measure of the overhang volume, that is s(S,V,α)=Vol(H(S,V,α))

Let f:P→ℝ be the mapping defined by the contribution of half line Δ(Z)

$$f(Z) = \sum_{\substack{i \in \{0,...,n(Z)-1\} \\ \langle V, N(X_{i+1}(Z)) \rangle \geq \cos\alpha}} \|X_{i+1}(Z) - X_i(Z)\|$$

Since $X_i$(Z)=Z-$\lambda_i$(Z)V and thanks to the $\lambda_i$(Z) ordering,

‖$X_{i+1}$(Z)-$X_i$(Z)‖=$\lambda_{i+1}$(Z)-$\lambda_i$(Z)

So that, if Δ(Z)∩∂S≠∅ then $$f(Z) = \sum_{\substack{i \in \{0,...,n(Z)-1\} \\ \langle V, N(X_{i+1}(Z)) \rangle \geq \cos\alpha}} \lambda_{i+1}(Z) - \lambda_i(Z)$$

And, if Δ(Z)∩∂S=∅, then f(Z)=0. The volume measure s(S,V,α) is defined by the integral:

s(S,V,α)=∫$_P$f(Z)dσ(Z)

Minimization Problem

Given the input solid S and the overhang threshold α, the purpose of the method is to find direction V* that makes the support volume as small as possible.

$$V^* = \underset{\substack{V \in \mathbb{R}^3 \\ \|V\|=1}}{\operatorname{argmin}} s(S, V, \alpha)$$

Unfortunately, the mapping $V \mapsto s(S,V,\alpha)$ is not continuous, which makes irrelevant all traditional optimization methods (deepest gradient, conjugate gradient, Newton-Raphson, etc.). For example, consider a rectangle solid illustrated in FIG. 13.

Figure 13:
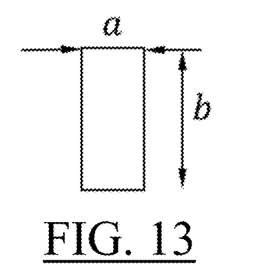

The support volume response curve $\theta \mapsto s(\theta)$ versus the direction angle $\theta$ is as follows.

| $\theta$ | $]0, \alpha[$ | $]\alpha, \frac{\pi}{2} - \alpha[$ | $]\frac{\pi}{2} - \alpha, \frac{\pi}{2}[$ |
|---|---|---|---|
| $s(\theta)$ | $\frac{a^2}{4}\sin 2\theta$ | $\frac{a^2+b^2}{4}\sin 2\theta$ | $\frac{b^2}{4}\sin 2\theta$ |

Figure 14:
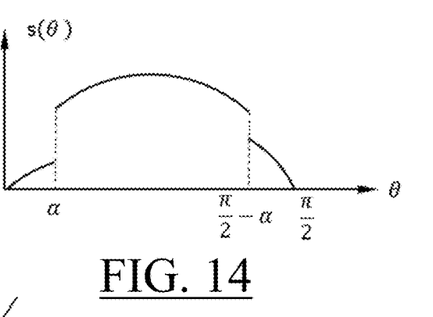

This yields the discontinuous curve represented on FIG. 14.

Figure 15:
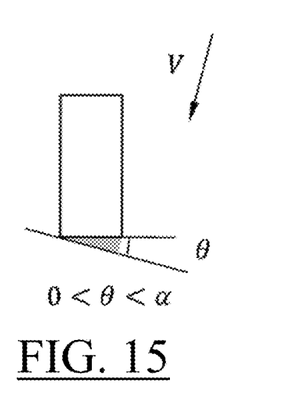
Figure 16:
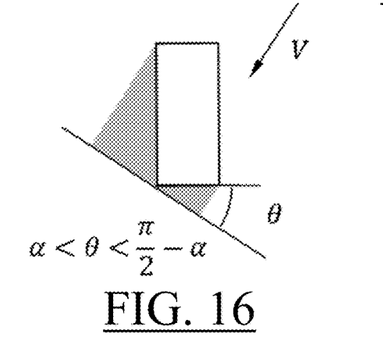
Figure 17:
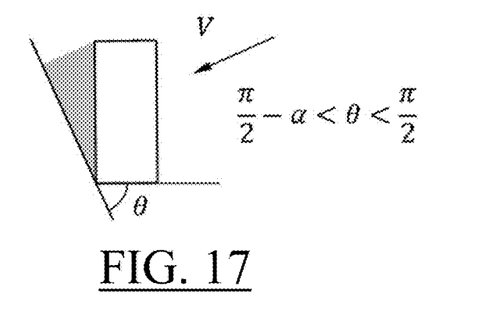

FIGS. 15-17 illustrate the overhang volume (grey zone) according to various directions.

Discretization

A brute force algorithm may respond to the poor smoothness of the objective function $V \mapsto s(S,V,\alpha)$. The domain of all possible directions $V$ is the unit sphere of $\mathbb{R}^3$. It is sampled in such a way that the directions density is approximately constant over the unit sphere. Noting n the integer number controlling the number of directions and noting $E(x)$ the largest integer number smaller than the real number x, the sampling is obtained by defining $$(V_{ij})_{\substack{j=1,\ldots,n \\ i=1,\ldots,M(j)}}$$

with spherical coordinates $$V_{ij} = \begin{pmatrix} \cos v_j \cos u_{ij} \\ \cos v_j \sin u_{ij} \\ \sin v_j \end{pmatrix}$$

And $$v_j = \frac{\pi j - 1}{2n}$$

$$M(j) = E(4n \cos v_j)$$

$$u_{ij} = 2\pi \frac{i-1}{M(j)}$$

Figure 18:
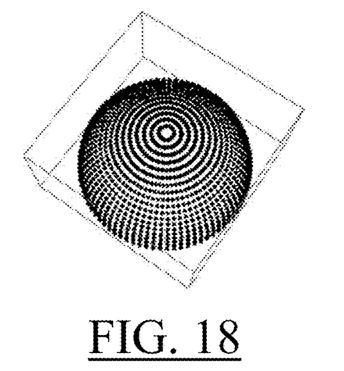
Figure 19:
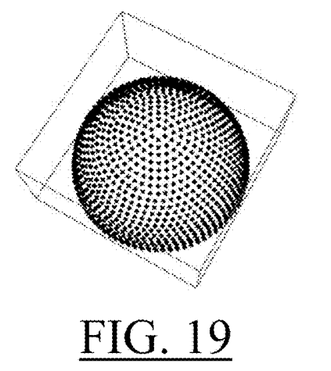

FIG. 18 illustrates a naïve sampling of the (half) unit sphere. FIG. 19 illustrates a more appropriate sampling which may be implemented by the method with n=20 yielding 1048 directions.

Figure 20:
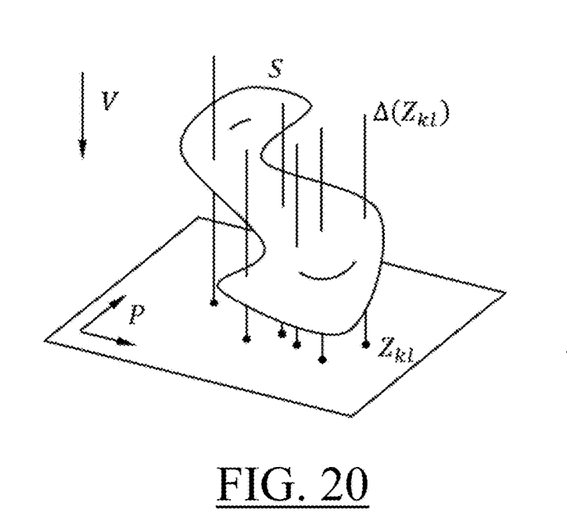

In addition, the domain of half lines starting points $Z \in P$ may be sampled by using a rectangular grid $$(Z_{kl})_{\substack{k=1,\ldots,K \\ l=1,\ldots,L}} \in P.$$

Figure 21:
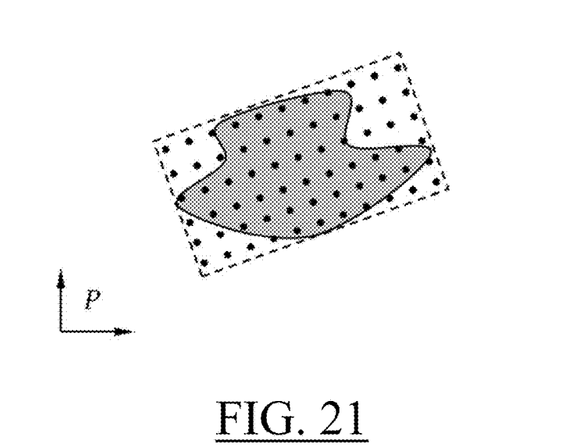

Firstly, the vertices of solid S are projected on plane P. Secondly, on plane P, the smallest rectangle including the projected vertices is computed. The orientation of the best rectangle is chosen in a list of predefined orientations. Lastly, points $z_{kl}$ are evaluated as a regular grid inside the best rectangle. A typical density value is a 32×32 grid of points.

FIG. 20 illustrates solid S, plane P and the $Z_{kl}$ points.

FIG. 21 illustrates the projected solid (grey zone), the best rectangle (dotted lines) and the grid points $z_{kl}$ (dots) inside the rectangle.

This way, integral formula for $s(S,V,\alpha)$ motivates the discrete version:

$$s_1(S, V, \alpha) = \sum_{\substack{k=1,\ldots,K \\ l=1,\ldots,L \\ \Delta(Z_{kl}) \cap \partial S \neq \emptyset}} \sum_{\substack{m \in \{0,\ldots,n(Z_{kl})-1\} \\ \langle V, N(X_{m+1}(Z_{kl})) \rangle \geq \cos\alpha}} \lambda_{m+1}(Z_{kl}) - \lambda_m(Z_{kl})$$

In other words, the measure $s(S,V,\alpha)$ of the support volume is approximated by a finite sum of line segments lengths $s_1(S,V,\alpha)$. Clearly, this approximation converges to the precise support volume as the grid density gets larger.

Figure 22:
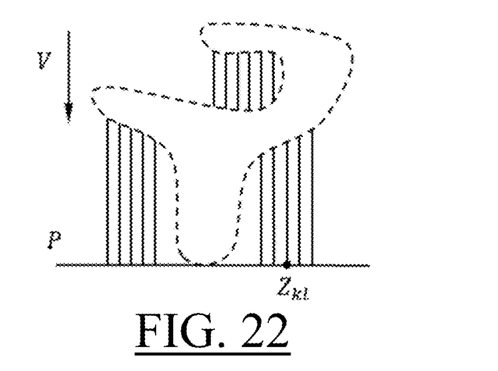
Figure 23:
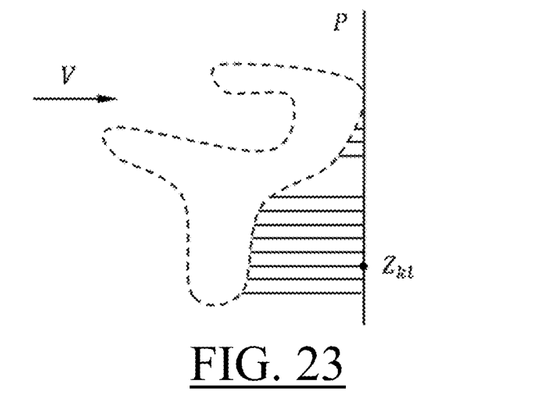

FIGS. 22-23 illustrate the line segments defined by a $Z_{kl}$ discretization with respect to two directions V.

The minimization problem is now changed into a finite searching among the directions sampling.

$$V^* = \underset{\substack{j=1,\ldots,n \\ i=1,\ldots,M(j)}}{\operatorname{argmin}}\, s_1(S, V_{ij}, \alpha)$$

Line/Solid Intersection

Computing $s_1(S,V,\alpha)$ massively uses line/solid intersections. For performance purpose, the line/solid intersection algorithm may be hardcoded for the vertical direction $$W = \begin{pmatrix} 0 \\ 0 \\ -1 \end{pmatrix}.$$

Figure 24:
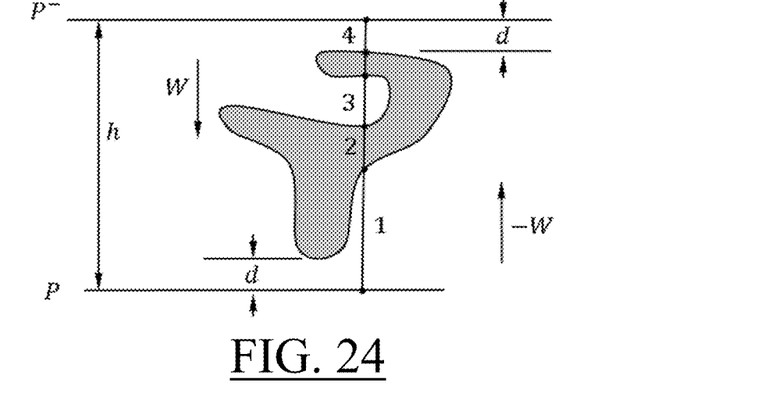

Before computing the intersection with an arbitrary line, the solid may be moved according to a rigid motion $D(\bullet)$ in such a way that the z direction of the axis system is equal to $-V$ and that the xy plane is the contact plane P. Let $P^-$ be the contact plane associated with direction $-W$ and h the distance between planes P and $P^-$.

In FIG. 24, line segment number 3 contributes to supports volume associated with direction W while line segments number 3 and 4 contribute to supports volume associated with direction $-W$. Both contributions may be computed by using the same intersection points with $\partial S$.

Then, the next algorithm may be run on the moved solid $D(S)$. It performs computations associated with direction W and direction $-W$ at the same time by reusing intersection results.

The signature of the method is $(x,\varepsilon)=s_2((Z_{kl})_{k,l},S,\alpha,h)$. Input data are the grid of points $(Z_{kl})_{k,l}$ corresponding to the solid's position, the solid S appropriately positioned, the threshold angle $\alpha$ and the offset distance h. Output data are x and $\varepsilon$. Real number x is the smallest (approximated) supports volume chosen from the one computed with direction w and the one computed with direction $-W$. Number $\varepsilon \in \{+1, -1\}$ says if x may be obtained using direction W (then $\varepsilon=+1$) or the opposite direction $-W$ (then $\varepsilon=-1$).

An ordered list $L(\bullet)$ may be implemented to store intersection information of half line $\Delta(Z)$ and $\partial S$. Precisely, list $L(\bullet)$ collects couples $(\lambda, -N_z(T))$ where $Z-\lambda W$ is the intersection point of vertical line $\Delta(Z)$ and triangle T and where $N_z(T)$ the z coordinate of the outer normal vector $N(T)$ of triangle T. Thanks to the positioning of solid S, $-N_z(T)$ is equal to the scalar product $\langle V, N(T) \rangle$. List $L(\bullet)$ may be initialized with (0,0) at instruction 04, populated at instruction 08 and read at instructions 12 to 17. Elements of list $L(\bullet)$ may be ordered according to increasing values of $\lambda$. This ordering is maintained through a binary search at instruction 08. The read/write convention is $L(i):=(\lambda,\sigma)$, $\lambda:=L(1,i)$ and $\sigma:=L(2,i)$.

Another list $L^-(\bullet)$ may be used to store intersection points between $\partial S$ and the vertical line associated with plane $P^-$. It is obtained by reversing list $L(\bullet)$ at instructions 11 to 14. Expression Projected(T) at instruction 06 refers to the projection of triangle T on plane P. Thanks to the positioning of solid S, the projected triangle Projected(T) may be obtained by ignoring the z coordinates of triangle's T vertices.

An example of pseudo code is now provided.

```
01   x⁺ ≈ 0
02   x⁻ ≈ 0
03   For each point Z of the (Z_kl)^(a,b)_{1≤k≤t} grid do begin
04     L(1) ≈ (0,0)
05     For all triangles T of ∂S do begin
06       If Z ∈ Projected(T) then
07         Compute parameter λ of point Z − λW = Δ(Z) ∩ T
08         Insert couple (λ, − N_z(T)) in the λ-ordered list L
09       End if
10     End for
11     L⁻(1) ≈ (0,0)
12     For i ≈ 2 to Size(L) do begin
13       L⁻(Size(L) + 2 − i):=(h − L(1,i), − L(2,i))
14     End if
15     For i ≈ 2 to Size(L) do begin
16       If L(2,i) ≥ cos α then x⁺ ≈ x⁺ + L(1,i) − L(1,i − 1)
17       If L⁻(2,i) ≥ cos α then x⁻ ≈ x⁻ + L⁻(1,i) − L⁻(1,i − 1)
18     End if
19     If x⁻ < x⁺ then
20       ε ≈ − 1
21     Else
22       ε ≈ + 1
23     End if
24   End for
25   Return (min {x⁺, x⁻}, ε)
```

The Z∈Projected(T) expression at instruction 06 is a "point inside triangle test". It may be performed using the well-known following formula. Consider point $Z \in \mathbb{R}^2$ and the triangle's vertices $P_1 \in \mathbb{R}^2$, $P_2 \in \mathbb{R}^2$ and $P_3 \in \mathbb{R}^2$. Compute the four 3×3 determinants:

$$d_0 = \det \begin{pmatrix} P_1 & P_2 & P_3 \\ 1 & 1 & 1 \end{pmatrix}$$

$$d_1 = \det \begin{pmatrix} Z & P_2 & P_3 \\ 1 & 1 & 1 \end{pmatrix}$$

$$d_2 = \det \begin{pmatrix} P_1 & Z & P_3 \\ 1 & 1 & 1 \end{pmatrix}$$

$$d_3 = \det \begin{pmatrix} P_1 & P_2 & Z \\ 1 & 1 & 1 \end{pmatrix}$$

Then, point Z is inside triangle $P_1, P_2, P_3$ if and only if $d_0$, $d_1$, $d_2$, and $d_3$ have the same sign. The parameter $\lambda$ computed at instruction 06 is $$\lambda = \frac{\langle Q - Z, N(T) \rangle}{N_z(T)}$$

where Q is any vertex of triangle T.

Overall Process

The overall process may include an initialization step to compute the directions sample $(V_{ij})$. The optimization step is a finite scanning of all directions, as described in next algorithm.

```
s* ≈ + ∞
For all directions V_ij do begin
  Compute the rigid motion D and the offset distance h
  Compute the (Z_kl)^(a,b)_{1≤k≤t} grid of points
  (x,ε) ≈ s_2((Z_kl)_{k,l}, D(S), α, h)
  If x < s* then
    s* ≈ x
    V* ≈ εV_ij
  End if
End for
```

The algorithm returns V* the best possible direction and the corresponding approximated support volume s*.

It should be noticed that computations related to each $V_{ij}$ are independent and can be advantageously parallelized.

Snapping Option

Experience proves that V* and s* can sometimes be improved by using a snapping step. The snapping algorithm is as follows.

```
Compute the rigid motion D so that direction V* is the opposite
vertical direction.
Move the solid according to rigid motion D.
Find the lowest vertex v of the solid according to vertical
direction.
For each triangle T adjacent to vertex v do begin
  Let N(T) be the outer normal of triangle T.
  Move the solid so that N(T) is the vertical direction.
  Compute the overhang volume s** of the solid.
  If s** < s* then
    s* ≈ s**
    V* ≈ N(T)
  End if
End for
```

Figure 25:
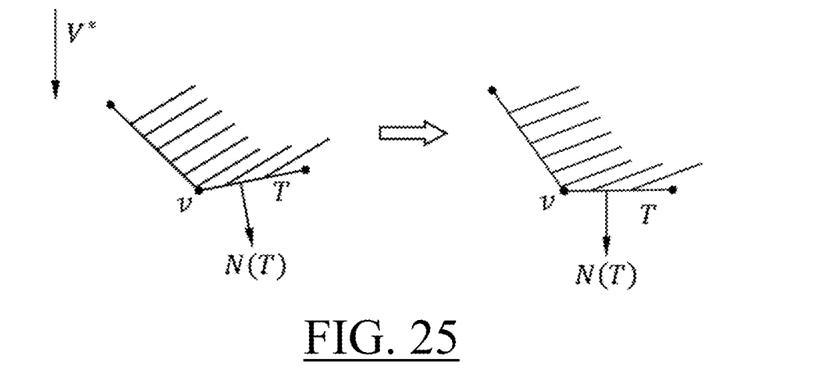

FIG. 25 illustrates the snapping principle.

Figures 26, 27, 28:
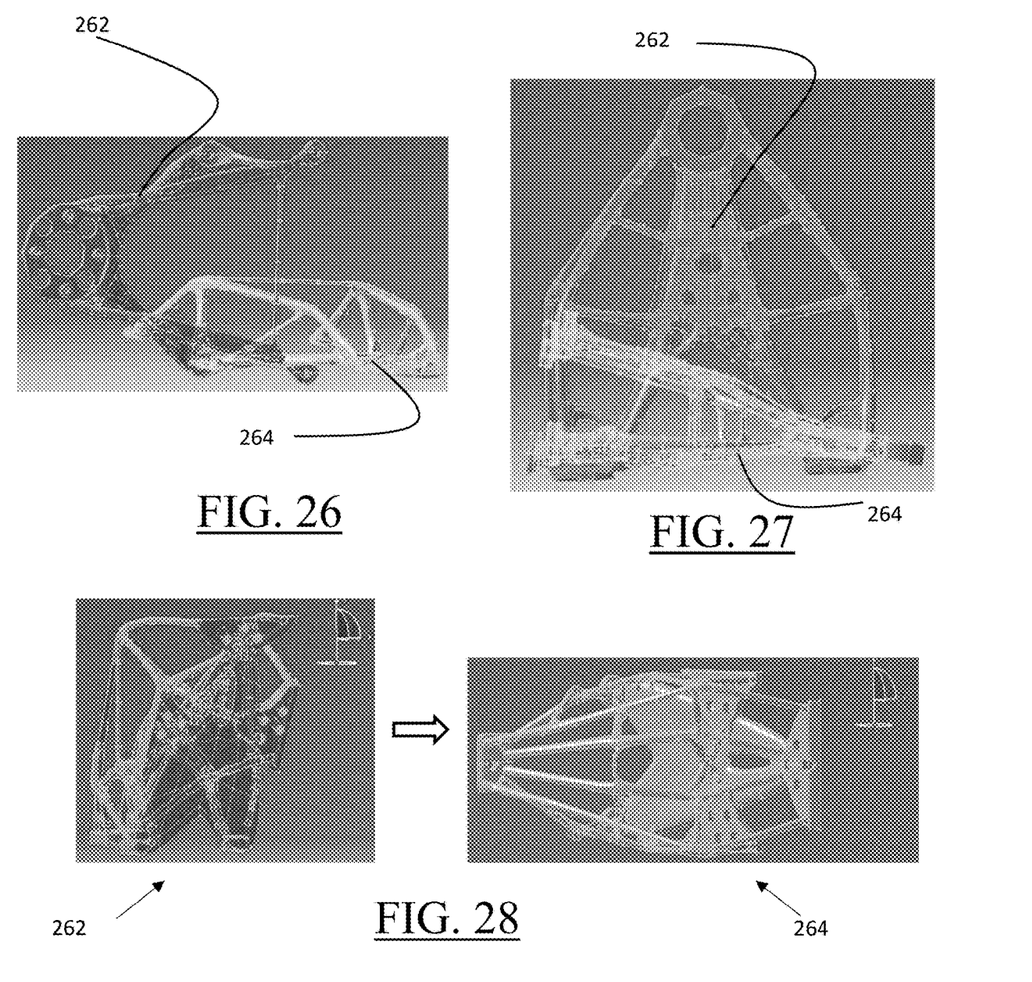

Tests of the method are now discussed with reference to FIGS. 26-28.

A 3D modeled object 262 representing a mechanical part was provided and its optimal orientation 264 was determined according to the above principles. The test converged toward the optimal orientation in respectively 1.9 seconds (respectively 3.8 seconds and 3.9 seconds), although 3D modeled object 262 comprised as many as 10 214 triangles for a 95 mm*67 mm*57 mm size (respectively 36 768 triangles for a 140 mm*119 mm*56 mm size and 38 122 triangles for a 244 mm*183 mm*124 mm size).

The invention claimed is:

1. A computer-implemented method for orienting 3D printing of a real object, the method comprising:
    obtaining a 3D modeled object that represents the real object; and
    determining one or more orientations of the 3D modeled object for which an overhang volume is optimal,
    wherein the determining of the one or more orientations includes:
        computing, for each one of a finite discrete set of orientations, a respective overhang volume, and
        identifying one or more orientations of the 3D modeled object for which the computed overhang volume is optimal, and wherein computing a respective overhang volume for each orientation of the discrete set includes:
  positioning the 3D modeled object in the orientation or in an opposite orientation,
  determining overhang segments, each overhang segment being delimited by intersections of a vertical line and the 3D modeled object skin or by intersections of a vertical line and a contact plane of the 3D printing, each overhang segment residing on the corresponding vertical line and being thereby straight and vertical, and
  summing length of the overhang segments.

2. The method of claim 1, wherein the finite discrete set of orientations corresponds to a constant-density sampling of a domain of all orientations.

3. The method of claim 1, wherein the determining of the one or more orientations further includes, for one or more of the identified orientations for which the computed overhang volume is optimal:
  determining one or more other orientations of the 3D modeled object that correspond to a snapping of the 3D modeled object,
  computing, for each one of the one or more other orientations, a respective overhang volume, and
  identifying one or more other orientations of the 3D modeled object for which the computed overhang volume is optimal.

4. The method of claim 1, wherein the discrete set of orientations comprises at least one pair including an orientation and an opposite of the orientation, the positioning of the 3D modeled object being performed only once for the pair.

5. The method of claim 4, wherein at least one same overhang segment is determined for both orientations of the pair, said same overhang segment being determined only once for the pair.

6. The method of claim 1, wherein the determining of overhang segments includes determining intersections between vertical lines and the 3D modeled object and determining segments of the vertical lines that correspond to overhang.

7. The method of claim 6, wherein the 3D modeled object includes a polygonal mesh.

8. The method of claim 6, wherein the vertical lines cover the 3D modeled object.

9. The method of claim 8, wherein the determining of the intersections between vertical lines and the 3D modeled object includes:
  projecting the 3D modeled object on a horizontal plane,
  determining a bounding box of the projection of the 3D modeled object on the horizontal plane,
  defining a grid of points in the bounding box, and
  defining the vertical lines based on the grid of points.

10. The method of claim 1, further comprising 3D printing the real object in one of the determined one or more orientations.

11. A non-transitory data storage medium having recorded thereon a computer program comprising instructions for performing a computer-implemented method for orienting 3D printing of a real object, the method comprising:
  obtaining a 3D modeled object that represents the real object; and
  determining one or more orientations of the 3D modeled object for which an overhang volume is optimal,
  wherein the determining of the one or more orientations includes:
    computing, for each one of a finite discrete set of orientations, a respective overhang volume, and
    identifying one or more orientations of the 3D modeled object for which the computed overhang volume is optimal, and
  wherein computing a respective overhang volume for each orientation of the discrete set includes:
    positioning the 3D modeled object in the orientation or in an opposite orientation,
    determining overhang segments, each overhang segment being delimited by intersections of a vertical line and the 3D modeled object skin or by intersections of a vertical line and a contact plane of the 3D printing, each overhang segment residing on the corresponding vertical line and being thereby straight and vertical, and
    summing length of the overhang segments.

12. The non-transitory storage medium of claim 11, wherein the discrete set of orientations corresponds to a constant-density sampling of a domain of all orientations.

13. The non-transitory data storage medium of claim 11, wherein the determining of the one or more orientations further includes, for one or more of the identified orientations for which the computed overhang volume is optimal:
  determining one or more other orientations of the 3D modeled object that correspond to a snapping of the 3D modeled object,
  computing, for each one of the one or more other orientations, a respective overhang volume, and
  identifying one or more other orientations of the 3D modeled object for which the computed overhang volume is optimal.

14. The non-transitory data storage medium of claim 11, wherein the discrete set of orientations includes at least one pair including an orientation and an opposite of the orientation, the positioning of the 3D modeled object being performed only once for the pair.

15. The non-transitory data storage medium of claim 14, wherein at least one same overhang segment is determined for both orientations of the pair, said same overhang segment being determined only once for the pair.

16. A system comprising:
  a processor coupled to a memory, the memory having recorded thereon a computer program comprising instructions for performing a computer-implemented method for orienting 3D printing of a real object, the processor being configured to implement the method by being configured to:
  obtain a 3D modeled object that represents the real object, and
  determine one or more orientations of the 3D modeled object for which an overhang volume is optimal,
  wherein the processor is further configured to determine of the one or more orientations by being configured to:
    compute, for each one of a finite discrete set of orientations, a respective overhang volume, and
    identify one or more orientations of the 3D modeled object for which the computed overhang volume is optimal, and
  wherein the processor is further configured to compute a respective overhang volume for each orientation of the discrete set by being configured to:
    position the 3D modeled object in the orientation or in an opposite orientation,
    determine overhang segments, each overhang segment being delimited by intersections of a vertical line and the 3D modeled object skin or by intersections of a vertical line and a contact plane of the 3D printing, each overhang segment residing on the corresponding vertical line and being thereby straight and vertical, and sum length of the overhang segments.

17. The system of claim 16, wherein the discrete set of orientations corresponds to a constant-density sampling of a domain of all orientations.

18. The system of claim 16, wherein the processor is further configured to determine the one or more orientations further by being configured to, for one or more of the identified orientations for which the computed overhang volume is optimal:

determine one or more other orientations of the 3D modeled object that correspond to a snapping of the 3D modeled object, compute, for each one of the one or more other orientations, a respective overhang volume, and identify one or more other orientations of the 3D modeled object for which the computed overhang volume is optimal.

19. The system of claim 16, wherein the discrete set of orientations includes at least one pair including an orientation and an opposite of the orientation, the positioning of the 3D modeled object being performed only once for the pair.

20. The system of claim 16, wherein at least one same overhang segment is determined for both orientations of the pair, said same overhang segment being determined only once for the pair.

* * * * *